May 5, 1970  TAKEO SEKI ET AL  3,510,197
PROJECTION SCREEN
Filed Nov. 29, 1967
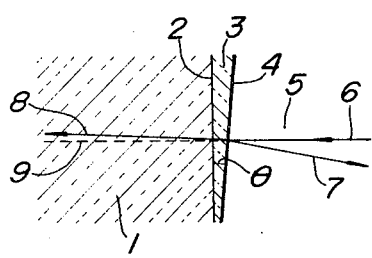
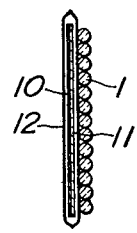
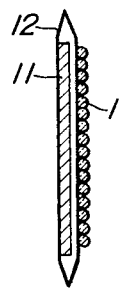
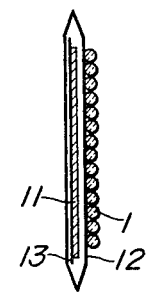
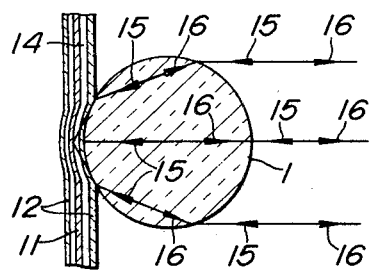
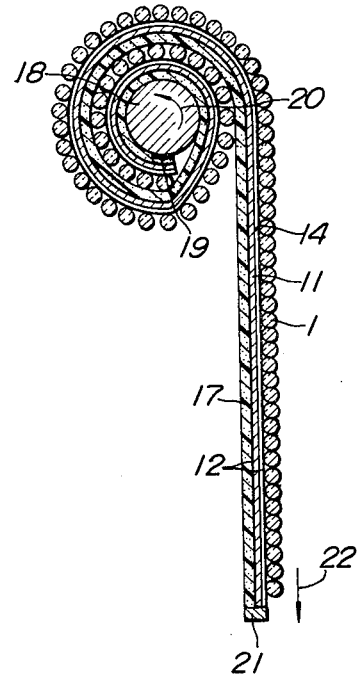
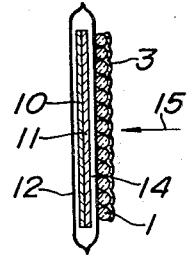
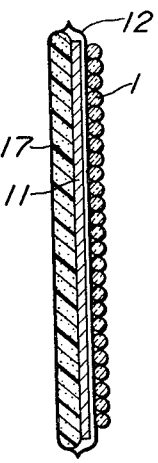
INVENTORS
TAKEO SEKI,
MASUO FUKUMURA
HAJIME FUKKE
BY *Craig & Antonelli*
ATTORNEYS United States Patent Office 3,510,197
Patented May 5, 1970

3,510,197
PROJECTION SCREEN
Takeo Seki and Masuo Fukumura, Kokubunji-shi, and Hajime Fukke, Tokyo, Japan, assignors to Hitachi, Ltd., Chiyoda-ku, Tokyo, Japan, a corporation of Japan
Filed Nov. 29, 1967, Ser. No. 686,550
Claims priority, application Japan, Dec. 9, 1966, 41/80,356; Dec. 28, 1966, 41/85,337; Sept. 11, 1967, 42/57,947
Int. Cl. G03b 21/56, 21/60
U.S. Cl. 350—117                                          4 Claims

ABSTRACT OF THE DISCLOSURE

A transparent film air-tightly encloses a reflection sheet with a diffused light reflection surface in such a relationship that the diffused light deflection surface of the sheet touches the film through a microscopic intermediate air layer, and multi-glass rods of circular cylindrical shape having a surface coating of epoxy resin cured by amine respectively are fixed in parallel on one outer surface of the film covering the reflecting surface of the sheet so that a projection screen is obtained.

BACKGROUND OF THE INVENTION

This invention relates to a projection screen used for motion pictures, large screen television and the like. Generally such a screen with a light reflecting surface of perfect diffusible nature has been heretofore employed for use of motion pictures, large screen television and the like. Although such prior art projection screen was advantageous in that a picture projected thereon could be satisfactorily viewed from various angular positions over a very wide range, it was disadvantageous in its poor degree of utilization of light because of the fact that the light was diffusely reflected in wide directions. Such a defect was a big obstruction to an attempt to readily project the desired picture on the screen without darkening the room, and there was an ever increasing demand for a successful solution of the above problem.

The defect pointed out here above might be solved by employing various means one of which forced to increase the intensity of light emitted from an associated projector and another of which provided a new screen with a directivity in its light reflecting property. The latter means has been found worthy of special attention because the latter means can easily be practiced at low cost compared with the former means.

The structure of a known projection screen provided with such a light reflection directivity comprises a sheet having a light reflecting surface of a substantially perfectly diffusible nature and a multiplicity of glass rods of transparent material having a substantially circular cylindrical cross section which are horizontally parallelly disposed on the light reflecting surface of the sheet. In the projection screen having such a structure, the light emitted from a projector impinges against the glass rods and is refracted by the surface of the glass rods to be concentrated on the reflecting surface of a substantially perfectly diffusible nature. The light is then diffusely reflected on the light reflecting surface and transmitted back through the glass rods again to finally enter the eyes of viewers. By virtue of the fact that the glass rods are horizontally disposed in parallel with each other as described above there is no directive light reflection in horizontal direction and only a vertical directive light reflection may be observed. Therefore, a satisfactory development in utility of the light can thereby be attained.

However, the above described projection screen has been still defective in two points, namely that a luminant straight line may appear on the projection screen, thus obstructing the proper view of the picture, and that the efficiency of reflection cannot be improved over a certain limit. The former defect is considered as the result from the fact that the light emitted to the screen from the projector causes specular reflection at a point on the surface of each of the plural glass rods so that the light of specular reflection enters the eyes of viewers, while the latter defect is considered as the result from the fact that a portion of the light diffusely reflected on the reflecting surface is repeatedly subjected to the total reflection in the respective rods and is thereby extinguished.

SUMMARY OF THE INVENTION

The present invention contemplates the provision of a projection screen in which light is reflected with a poor directivity in one plane while the light is reflected with sharp directivity in a plane perpendicular with respect to said plane.

It is an object of the present invention to obviate such an undesirable phenomenon that a luminant straight line appearing on a projection screen obstructs the proper view of a picture being projected on the screen.

Another object of the present invention is to avoid any reduction in the efficiency of reflection.

A further object of the present invention is to provide a projection screen which can easily be wound to be taken up by a mandrel for the convenient preservation thereof and which can satisfactorily attain the first and second objects described above.

In order to attain the first and second mentioned objects described above, a projection screen according to the present invention comprises a diffused light reflection sheet having a diffusely light reflecting surface; an airtight bag of a transparent film enclosing therein the diffused light reflection sheet in such a relationship that said transparent film touches the diffusely light reflecting surface of said diffused light reflection sheet through a microscopic intermediate air layer therebetween; and a multiplicity of cylindrical rods of transparent material bonded in parallel relation to each other on the outer surface of a portion of said film to which the diffusely light reflecting surface of said diffused light reflection sheet opposes said rods being coated with a transparent film having a minute rippled surface with gentle slopes.

Further, in order to attain the third mentioned object described above, the present invention provides a projection screen of the above-described character in which said diffused light reflection sheet and said film bag are made of flexible materials, said multiple rods are bonded separably from each other, and a support member of elastic material is additionally provided on the outer surface of said film bag on the reverse side which is remote from the side at which said multi-rods are disposed.

BRIEF DESCRIPTION OF THE DRAWINGS

FIG. 1 is a schematic view illustrating the principle of the present invention for the prevention of specular reflection.

FIGS. 2 to 4 are schematic vertical sectional views showing a few preferred structures according to the present invention which are adapted to avoid any loss of light.

FIG. 5 is a schematic view illustrating the principle of the present invention for the elimination of the light loss.

FIG. 6 is a schematic vertical sectional view of a preferred embodiment of the projection screen according to the present invention.

FIG. 7 is a schematic vertical sectional view of another embodiment of the present invention.

FIG. 8 is a schematic vertical sectional view of a further embodiment of the present invention.

DESCRIPTION OF THE PREFERRED EMBODIMENTS

The first mentioned object of the present invention can be attained by providing on the surfaces of circular cylindrical rods of transparent material with a coating of such a material, for example epoxy resin cured by amine or material such as starch of dogtooth violet which preliminary dissolved in warm water is used by cooling down to room temperature, as can provide a transparent filmy coating having a minute rippled surface with gentle slopes. In other words, since the surface of such a filmy coating is in the form of minute ripples with gentle slopes, irregular reflection of light occurs at the surface of the rods so that the luminant line disturbing the proper view can be rendered substantially harmless as a matter of fact. According to the present invention the path of light entering the rods of transparent material such as glass is not appreciably affected by the presence of the minute ripples with gentle slopes on the surface of the transparent coating provided to cover on the rods, and therefore the satisfactory reflection directivity required for a projection screen is not disturbed at all in spite of the presence of such coating as will be described in detail with reference to FIG. 1.

FIG. 1 is an enlarged sectional view of the surface portion of the rod for illustrating the principle of the present invention for the obviation of undesirable specular reflection. In FIG. 1, a surface 2 of a rod 1 of transparent material is shown as being coated with a transparent film 3 having a minute rippled surface 4 with a gentle slope. Assuming now that the intersecting angle $\theta$ between the surface 2 of the rod 1 and the surface 4 of the film 3 is quite small, wherein a light ray is transmitted from a direction 6 through an ambient air layer 5 to the rod surface 2 in a substantially perpendicular relation with respect thereto, most of the light ray may proceed in the dotted direction, 9, and the reminder may be reflected in the reverse direction to the arrow 6, but where there is a film 3 on the surface 2 of the rod 1, the reflected portion of the light ray impinged in the same manner as described above may proceed in a direction 7 which is displaced by a relatively large angle of $2\theta$ from the direction 6. Further, suppose that the transparent rod 1 and the transparent film 3 have a common index of refraction $n$, the transmitting portion of the light ray which passes through the transparent film 3 and the transparent rod 1 is only slightly displaced in a direction 8 by a relatively small angle $$\left(1-\frac{1}{n}\right)\theta$$

from its normal penetrating direction 9. It is thus possible to sufficiently diffuse the reflected light and to render the path of the transmitting light substantially unvariable. Therefore, the luminant line that may appear on the projection screen can be rendered substantially harmless as a matter of practical use, and the satisfactory reflection directivity required for the projection screen can be substantially maintained even though the presence of such a transparent film 3. A frosting technique may be employed as to another method for providing a diffused light reflection property on the surface of the transparent rod 1. But the transparent rod 1 is processed by the above technique, the path of transmitted light is relatively largely deviated and thereby the satisfactory reflection directivity desired for the projection screen is deteriorated, because the surface so processed has minute ripples thereon with very steep slopes. According to another method, a ¼ wavelength film may be provided on the surface of the transparent rod 1 for the prevention of undesirable specular reflection, but this method is economically unacceptable in view of high cost involved therein. There may be various other materials and methods use for obtaining such a transparent film, than these of the present invention, but a transparent film commonly obtained from such materials by such methods has, in many cases, a smooth surface which produces the undesirable specular reflection. The materials employed in the present invention for preparing the transparent film or coating 3 the surface of which is provided with minute ripples with gentle slopes are preferably epoxy resin cured by amine or a kind of starch of the dogtooth violet, of the surface tension of which is relatively small and the fluidity of which is relatively quickly lost before it solidifies.

The second mentioned object of the present invention may be attained by constructing the projection screen according to the steps of preparing an air-tight bag of a transparent material such as polyethylene, inserting a light reflecting film having a light reflecting surface of a substantially perfectly diffusible nature in the bag, evacuating the bag enclosing therein the light reflecting film, sealing the evacuated bag and then bonding a multiplicity of circular cylindrical rods of transparent material by a transparent adhesive on the outer surface of the transparent film forming the bag to cover the reflecting surface of the reflecting film.

A preferred structure of the projection screen is illustrated in FIG. 2. This structure can be obtained by coating a pure white pigment such as, for example, $MgF_2$, $MgO$ or $BaSO_4$ on one surface of a sheet of paper 10 to make a diffused light reflection film 11, enclosing the diffused light reflection film 11 in an air-tight bag 12 formed of a transparent material, such as, for example, polyethylene after evacuating the interior of the bag 12, and then bonding a multiplicity of circular cylindrical rods 1 of transparent material by a transparent adhesive on the outer surface of the transparent and air-tight film forming the bag is on the side opposite to the diffusely light reflecting surface of the film 11, as shown in FIG. 2. The diffused light reflecttion film 11 may alternatively be provided with a coating of a white pigment of the kind described above on the inner surface of opposite portion of the transparent film 11 which opposes to the portion on which the rods 1 are bonded at the outer surface thereof, as shown in FIG. 3, or by relatively thinly coating the white pigment on a sheet 13 such as an aluminum foil having a high index of specular reflection as shown in FIG. 4.

The reason why the second mentioned object of the present invention can be attained by the above structure of the projection screen will be described with reference to FIG. 5.

FIG. 5 is an enlarged vertical sectional view of a part of the projection screen for illustrating the principle of the present invention for the obviation of light loss. The structure shown in FIG. 5 is obtained by the method described above, and it will be seen that the diffused light reflection film 11 enclosed in the evacuated bag 12 formed of the transparent and air-tight film is in contact with the transparent and air-tight film bag 12 with a microscopically thin intermediate air layer 14 interposed therebetween, and also the transparent and air-tight film 12 is substantially integrally bonded thereon with a circular cylindrical rod 1 of transparent material by the transparent adhesive. Accordingly, incident light rays 15 substantially parallelly transmitted to various surface points on the rod 1 are concentrated by the transparent rod 1 through a thin air layer 14 onto the surface of the diffused reflection film 11 to illuminate the same with a high degree of illumination, and reflected light rays 16 of a high brightness are led on their return path through the thin air layer 14 to enter the transparent and air-tight film 12 and the transparent rod 1 and scattered out over a wide angular range. Thus, any loss of light that may be developed by the repetition of the total reflection can hardly occur because of the presence of the air layer 14. Further, by virtue of the structure such that the diffused light reflection film 11 is enclosed in the evacuated bag 12 consisting of the transparent and air-tight film, the external atmospheric pressure urges the diffused light reflection film 11 to its stable position at which the film 11 is always situated adjacent to that portion of the transparent film 12 having the bonded transparent rods 1 thereon, and no variation may take place in the reflection directivity of the screen. A further advantage derivable from the above structure is that an undesirable deterioration of the diffusely light reflecting surface of the diffused light reflection film due to contact with dust or moisture can not occur in any way. The position of the diffused light reflection film 11 relative to the position of the transparent rod 1 may be stabilized by a method in which a sheet of soft and elastic material such as foamed polyethylene or foamed polyurethane may be disposed on the rear side of the diffused light reflection film 11 so that the soft and elastic sheet urges lightly the diffused light reflection film 11 toward the transparent rod 1 to thereby establish a fixed positional relation therebetween.

An embodiment shown in FIG. 8 exemplifies the structure described above. In FIG. 8, a compressed continuous sheet 17 of foamed polyurethane is enclosed in conjunction with the light reflecting film 11 at the reverse side thereof in an evacuated bag 12 of polyethylene as described above and the force of expansion of the foamed polyurethane sheet 17 is utilized to urge and compress a diffused light reflection film 11 toward the transparent rods 1. Such a structure is advantageous in that, even if external air might intrude into the polyethylene bag 12 with the lapse of time, such air is first absorbed by the expansion of the compressed polyurethane sheet 17, and since the internal air pressure of the bag 12 is lower than the external air pressure by the expansion pressure of the foamed polyurethane sheet 17, the thin air layer 14 between the transparent rods 1 and the diffusely light reflecting surface of the film 11 can be maintained at a constant thickness over a long period of time, and the thickness of the air layer 14 can be made uniform throughout the length of the projection screen. The structure described above is further advantageous in that a simple air exhausting procedure including applying an external pressure to the polyethylene bag 12 and purging the air in the bag 12 while compressing the foamed polyurethane sheet 17 can easily and effectively attain the desired air exhausting operation. In this embodiment, the polyurethane sheet 17 with continuous foams therein is shown as extending continuously all over the back face of the diffused light reflection film 11, but it will be understood that the polyurethane sheet 17 is not necessarily provided at the back face of the film 11 but it may be provided at a certain portion of the bag 12 so that the expansive force thereof may urge the film 12 to compress the film 11. Further, the projection screen of the structure shown in FIGS. 2, 3, 4 and 8 may be mechanically strengthened by bonding the transparent rods 1 to each other in order to integrally combining the many rods 1 as an assembly in a plate-like form.

FIG. 6 is a schematic vertical sectional view of an embodiment according to the present invention. The projection screen embodying the present invention comprises a multiplicity of parallelly disposed circular, cylindrical rods 1 of transparent material, a diffused light reflection film 11 obtained by coating a pure white pigment such, for example, as $MgF_2$, MgO or $BaSO_4$ on one surface of a sheet of paper 10, a transparent film 3 coated on the surface of the rods 1 and having a surface with minute ripples of gentle slope, and a bag 12 of material such, for example, as polyethylene for sealingly enclosing therein the diffused light reflection film 11. In the above structure, a microscopic intermediate air layer 14 is interposed between the diffusely light reflecting surface of the film 11 and the transparent rods 1. When now a light ray 15 is emitted from a projector reaches the projection screen, that portion of the light ray which is reflected by the surface of the screen is subjected to irregular reflection by the presence of the transparent film 3 having the minutely but gently rippled surface and can not be observed as a luminant line, while that portion of the light ray which penetrates into the screen is effectively subjected to diffused reflection by the diffusely light reflecting surface of the film 1 as described in detain with reference to FIG. 5. Further, since the loss of light in the rods 1 of transparent material hardly occurs by virtue of the interposition of the microscopic air layer 14, the projection screen of the present invention can stably give a higher brightness than prior art projection screens. The structure of the diffused light reflection film 11 is in no way limited to that referred to in the embodiment of FIG. 6, but it will be apparent that any one of the structures described with regard to the illustration of the principle of the present invention may be employed in lieu thereof.

FIG. 7 is a schematic vertical sectional view of another embodiment of the present invention which is especially suitable for the attainment of the third object described previously. The projection screen shown in FIG. 7 comprises a multiplicity of parallelly disposed, circular, cylindrical rods 1 of transparent material which are separable from each other by folding the screen, a diffused light reflection film 11, a bag 12 formed of a transparent and air-tight film and including therein the diffused light reflection film 11, a microscopic air layer 14 intervening between one side of the bag 12 and the diffusely light reflecting surface of the film 11, and a sheet 17 of elastic material such, for example, as foamed polyurethane. The projection screen having a structure as described above is shown as being wound around a mandrel 18. The diffused light reflection film 11 may be obtained by coating a pure white pigment such, for example, as $MgF_2$, MgO or $BaSO_4$ on a sheet of cloth, and the transparent rods 1 which may be of glass are bonded by a transparent adhesive to the outer surface of the bag 12 on the side opposite to the diffusely light reflecting surface of the film 11. The elastic sheet 17 is bonded to the outer surface of the bag 12 on the side which is remote from the side having thereon the transparent rods 1. The elastic sheet 17 is securely fixed at its top end 19 or at a portion adjacent to the top end 19 to the mandrel 18 by an adhesive.

The projection screen having a structure as described above can easily be taken up by the mandrel 18 when the mandrel 18 is merely rotated in a direction as shown by the arrow 20, because both the foamed polyurethane sheet 17 and the diffused light reflection film 11 are satisfactorily flexible and the transparent rods 1 are separable from each other. The projection screen wound around the mandrel 18 can easily be stretched to its straightly extended position by merely pulling the lower end 21 of the projection screen in the direction as shown by the arrow 22.

In the embodiment described above, an elastic sheet made of polyurethane is employed by way of example, but it will be understood that the elastic sheet in the present invention is in no way limited to such a specific material and any other elastic sheet such, for example, as a sponge rubber sheet or a foamed polyethylene sheet may be employed in lieu thereof.

It will be understood that the structure illustrated in FIG. 7 gives a projection screen which can easily be wound around a mandrel, for the convenient preservation thereof, and which attains the first object and the second object of the present invention.

It will be appreciated from the foregoing detailed description that the present invention provides a projection screen which is an improvement over the prior art screen in that a novel principle is applied to the past invention. The projection screen according to the present invention, when disposed in an appropriate direction and utilized for picture projection purpose, can exhibit such a marked effect that all of the viewers accommodated in a substantially fixed plane can properly see a brighter picture than heretofore without being interfered by the light of specular reflection, without any wasteful loss of brightness and without nay unstable variation in brightness.

It is to be understood that the rods of transparent material referred to in the specification are not in any way intended to designate those having a substantially circular cylindrical cross section illustrated hereinbefore and are intended to include a plate of optically transparent material having a multiplicity of horizontally juxtaposed lenticular projections on both the front and rear surfaces thereof, a plate of optically transparent material having a multiplicity of horizontally juxtaposed lenticular projections solely on the front surface thereof, and the like.

We claim:

1. A projection screen comprising: a diffused light reflection film having a diffusely light reflecting surface; an air-tight bag of a transparent film substantially evacuated and air-tightly including therein said diffused light reflection film in such a relationship that said transparent film is spaced from the diffusely light reflecting surface of said diffused light reflection film by a microscopic intermediate natural air layer therebetween; and a multiplicity of rods of transparent material bonded in parallel to each other on the outer surface of a portion of said bag which covers the diffusely light reflecting surface of said diffused light reflection film, said rods having a surface with minute ripples of gentle slopes.

2. A projection screen according to claim 1, in which said diffused light reflection film and said bag are both flexible, said rods are separable from each other by folding the screen, and a sheet of elastic material is further provided on the outer surface of said film of said bag on the reverse side remote from the side at which said rods are disposed.

3. A projection screen according to claim 1, which further comprises a compressible elastic material disposed in said bag in its compressed state.

4. A projection screen according to claim 3, wherein said compressible elastic material is provided in a form of sheet, said sheet being attached on the reverse side of the diffused light reflection film.

References Cited

UNITED STATES PATENTS 1,998,054  4/1935  McBurney _____ 350—126

FOREIGN PATENTS 766,655  4/1934  France.

JULIA E. COINER, Primary Examiner

U.S. Cl. X.R.

350—128